R. J. GATLING.
Steam-Plow.
No. { 1,596, 32,600. }
Patented June 18, 1861.
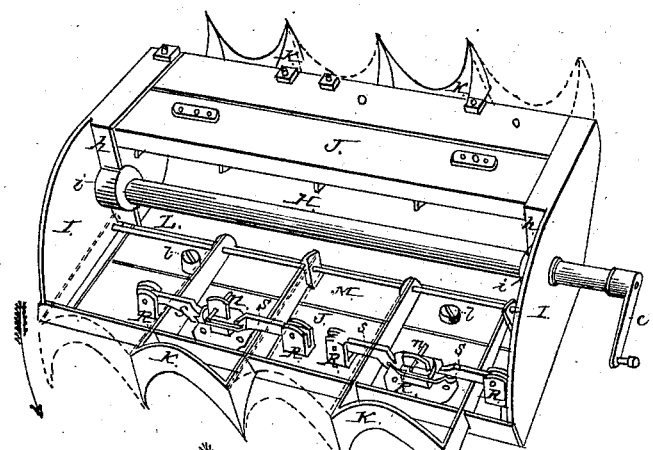
Fig. 1.
Fig. 5.
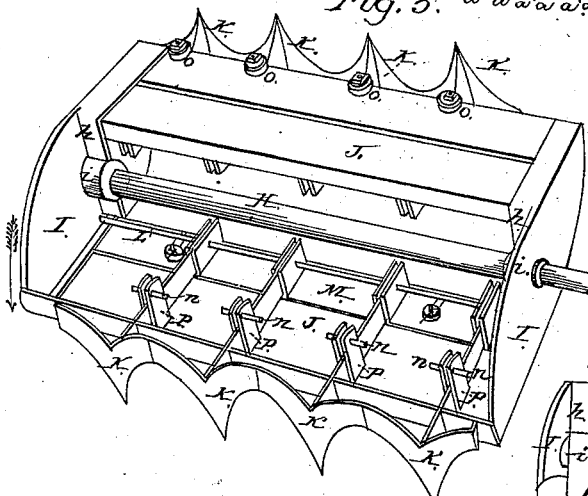
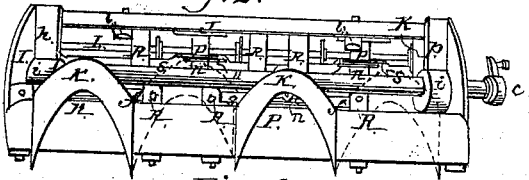
Fig. 2.
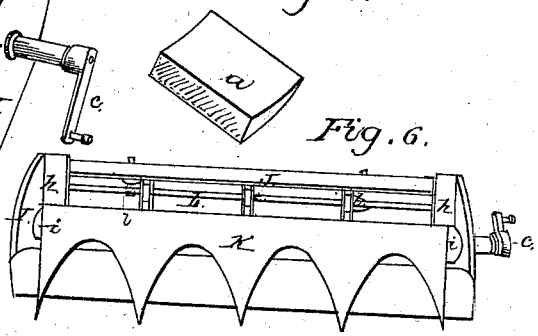
Fig. 4.
Fig. 6.
Witnesses:
Inventor:
Richard J. Gatling
N. PETERS, PHOTO-LITHOGRAPHER, WASHINGTON, D. C.

UNITED STATES PATENT OFFICE.

RICHARD J. GATLING, OF INDIANAPOLIS, INDIANA.

IMPROVEMENT IN MACHINES FOR PARING AND PULVERIZING THE SOIL.

Specification forming part of Letters Patent No. 32,600, dated June 18, 1861.

*To all whom it may concern:*

Be it known that I, RICHARD J. GATLING, of Indianapolis, county of Marion, and State of Indiana, have invented a new and useful Improvement in Machines for Paring and Pulverizing the Soil; and I do hereby declare that the following is a full, clear, and exact description thereof, reference being had to the accompanying drawings, making part of this specification, in which—

Figure 1 is a perspective view of the share-frame of my machine for breaking and pulverizing the soil, patented May 29, 1860, with my improved cutters or shares K K, &c., attached thereto. Fig. 2 is a top view of the share-frame with the cutters or shares attached, and showing the form of their forward or cutting edges. Fig. 3 is a section view through the soil, showing how the pieces or sections of soil are cut out and the position in which they are deposited by the action of the revolving shares. Fig. 4 is a perspective view of one of the pieces or sections of soil seen at *a a a*, &c., in Fig. 3. Fig. 5 is a perspective view of the share-frame, showing a modification of the cutters or shares and the manner of attaching them to the share-frame. Fig. 6 is a top view of the share-frame, showing another modification of the cutters or shares as constructed in one entire piece.

Similar letters of reference indicate corresponding parts in the several figures.

The share-frame, as shown in Figs. 1, 2, 5, and 6, is similiar in construction to the share-frame shown and described in my patent of May 29, 1860, for machine for breaking and pulverizing the soil; but the cutters or shares K K, &c., of my present improvement are designed to be used in place and instead of the shares K described and represented in that patent.

My invention consists in shares made and constructed with sharp cutting-edges in front, in shape and form as shown at K K, &c., in Figs. 1, 2, 5, and 6, so that they may pass through the soil edgewise, thus presenting the least possible resistance, and in the novel use and application of said cutters or shares in paring and pulverizing the soil, as hereinafter more fully described.

To enable others skilled in the art to make and use my invention, I will proceed to describe it.

The cutters or shares are made of iron or steel, bent and curved in the form indicated at K K, &c., Figs. 1, 2, 5, and 6, having their forward edges sharp, so as to cut easily from the soil sections or pieces of soil in shape and form as shown at *a a a*, &c., Figs. 3 and 4.

The cutters or shares K K, &c., in Figs. 1 and 2, are arranged in the two edges of the share-frame in such manner that the shares on one edge of the share-frame cut out the pieces of soil left by the shares of the other edge; but additional shares, as indicated by the red dotted lines, may be placed in the spaces between the shares K K, &c., thus making the shares on both edges cut out the soil the entire length of the share-frame. The shanks of the cutters or shares are fastened at their inner ends on rods or by pivots, so that they may swing back in the sides of the share-frame. The cutters or shares are held in place and prevented from thus swinging back by the levers S S S S, pivoted at R R R R, and wooden pins *n n*, through posts P P. The object of this arrangement is to prevent the cutters or shares from being broken in case they should come in contact with a stump or other rigid object, as the levers S S, &c., would yield by the breaking of the wooden pins *n*, which would allow the cutters or shares to swing back, and thus prevent injury to the machine, save that of breaking the wooden pin, which could be readily replaced by the operator.

The pivots of the cutter or share shanks are placed eccentric to the shaft of the share-frame, so that as the shares swing back they may be carried above obstructions.

The revolution of the share-frame in the direction indicated by the arrows and the action of the shares on the ground assist to propel the machine onward, thereby requiring but little additional power to move the machine over the land when the same is at work.

The shares are thrown out of work by simply turning and stopping the share-frame, so that a line joining the two rows or sets of shares will be in a horizontal position, which position of the shares will allow the machine being turned easily at the headlands.

The cutters or shares may also be made, as represented at K K, &c., in Fig. 5, so as virtually to form one continuous cutter or share the whole length of the share-frame at the same time they are in separate parts, as clearly shown in the drawings. These shares are fastened at the inner ends of their shanks or stocks in the same manner as the shares before mentioned; but each share is prevented from swinging back into the sides of the share-frame by the wooden pins n n n n, which pass over the backs of the shanks or stocks of the shares through holes in the double posts P P P P. These posts have an india-rubber spring, o o o o, on their shanks on the opposite side of the wooden bar J, between the bar and the nut that secures the posts, which serves in some degree to relieve the share and the wooden pin n from sudden shock or jar by allowing the posts P and cutter or share to yield slightly as the shares enter the soil.

The shares or cutters may, if desired, also be constructed in one entire piece, as clearly shown at K, Fig. 6.

These different shares all cut, pare, and pulverize the soil in the same manner as above stated.

In the construction and arrangement of the shares described I design that every point or part of the forward horizontal cutting edges of said shares shall be of equal distance from the center of the main shaft H; and I design also that the rear horizontal parts of said shares or blades are to be at all parts or points of same of equal distance from the center of said main shaft H; but the rear horizontal parts of the shares should be a little nearer the center of said shaft H than the front or cutting horizontal edges of said shares, which set or dip of the horizontal share-blades will permit the shares or blades—allowing for the advance of the machine when the same is in operation—to enter and pass in and through the soil edgewise.

The practical effect produced by the revolving shares or cutters, when constructed, arranged, and operated as described, will be to cut and divide the earth in sections or pieces of equal size and shape when the machine is operating on a level surface and having a uniform forward motion, said sections or pieces of soil thus cut and divided being in shape and form as described and as shown in Figs. 3 and 4 in the drawings.

Among the objects and advantages to be achieved by so constructing and arranging the horizontal share-blades as to allow them to go in and through the earth edgewise are the following: first, to allow of quick speed or motion of the rotating shaft; second, a saving of power and expense in thoroughly pulverizing a given amount of soil.

I have shown and described these various modes of constructing, attaching, and using the peculiar-shaped cutters or shares in order to point out and explain more fully the principle and several modes in which I have contemplated the application of the principle or character of my improvement and by which it may be distinguished from all other inventions. It will be seen that the manner of attaching the cutters or shares to the share-frame and regulating their depth of cut is substantially the same as that described in my patent of May 29, 1860. The practical effect, however, produced by the cutters or shares of my present improvement is essentially different from that produced by the teeth or shares, as shown and described in my said patent.

The operation of the machine is as follows: By the revolving of the share-frame by the power of the engine attached, and as the machine is being moved forward by animal or other power, the cutters or shares enter the earth edgewise in a curved line, so as to produce the least possible resistance in their passage through the soil, as represented by the dotted lines and arrow in Fig. 3, cutting from the soil slices or pieces of earth, which are by the rotary motion of the shares lifted from their place of lodgment, the shares passing entirely under said slices or pieces of earth, and the said slices or pieces of earth thus cut are moved to the rear of the machine, and their rear edges so elevated as to overlap and partially cover up the slices or sections of earth previously cut and deposited, as represented and shown at a a a a, &c., Fig. 3. By this process the soil is thoroughly pulverized, and the grassy or surface portion of the soil is completely covered up, as represented by the green shading on the sections or pieces a a a, &c., Fig. 3.

To describe more fully the effect produced by the use and practical application of the cutters or shares described, I would say that the sections or pieces of earth, cut and severed from the original soil in manner stated, in leaving the shares fall so as to overlap each other somewhat similar to the inverted shingling of a house-roof, as shown at a a a, &c., Fig. 3. It is not to be supposed, however, that the sections or pieces of earth cut from the soil will retain their rigid and perfect shape indicated in Fig. 3, for of course the soil will crumble and fall so as to form a smoother surface than shown by the drawings.

By a slight change in the convexity and shape of the shares, aided by the rotary motion of the shares, the sections or pieces of earth cut by the shares may be made to fall edgewise from the share, or may be entirely inverted as they fall from the machine—in other words, made to fall bottom side up.

The advantages of my invention over other modes of breaking and pulverizing the soil consist in the peculiar manner herein shown and described of paring, slicing, or cutting out and depositing pieces of soil in way and manner stated without their being compressed and packed together, thereby exposing the soil more thoroughly to the fertilizing influences of the sun, rains, and atmosphere. The ordinary plow presses and turns the soil from its original position, (acting on the wedge principle,) while the shares in my improvement cut and lift the soil from its place of lodgment, thereby producing no downward pressure and requiring less power to pulverize a given amount of soil than is required to produce like results by the ordinary plow or any other method of pulverizing the soil heretofore known or practiced by agriculturists.

The shares or cutters may be adjusted to cut and pare off the surface of the earth only one inch in depth; or they may be set to cut and pulverize the soil a foot in depth, if desired. This result is effected by means of the adjustable plate, $m$, and screws $l\ l$.

This method of paring and pulverizing the soil will be found of great practical advantage in preparing many soils for the seed, especially in the first breaking of prairie lands, which should be plowed or broken very shallow for the following reasons, viz: first, shallow plowing better kills and subdues the grass found growing on such soils; second, shallow plowing or breaking of such land has been by experiment found to be very beneficial and essential to the production of good wheat crops, for the reason that the lower grass-roots of the primitive prairie grass should not be disturbed, but suffered to remain as a means of protecting the wheat from being winter killed. The matted grass-roots when not disturbed form a kind of net-work which holds the wheat and prevents it getting destroyed by the action of the frosts during the winter months. For the foregoing reasons it is very essential that the first breaking of prairie lands should be done as shallow as possible.

The shares in my machine, as heretofore stated, can be set so as to shave and pare off the surface soil lightly—that is to say, just enough to destroy the growing grass.

This work or process of pulverizing the soil can be done with my machine with a great deal less power than would be required if performed by the use of the ordinary plow and with far greater dispatch.

Having thus fully described my invention, what I claim as new, and desire to secure by Letters Patent, is—

The shares or cutters lettered K, when made, constructed, arranged, and operated substantially as shown and specified, for the purpose set forth.

RICHARD J. GATLING.

Witnesses:
O. F. MAYHEW,
JAMES L. MITCHELL.